United States Patent [19]

Suzuki et al.

[11] Patent Number: 4,979,043
[45] Date of Patent: Dec. 18, 1990

[54] VIDEO SIGNAL PROCESSING CIRCUIT

[75] Inventors: Masahiro Suzuki, Yokohama; Ryuzo Motoori, Kawasaki, both of Japan

[73] Assignee: Nikon Corporation, Tokyo, Japan

[21] Appl. No.: 397,249

[22] Filed: Aug. 23, 1989

[30] Foreign Application Priority Data

Aug. 29, 1988 [JP] Japan .................................. 63-214136

[51] Int. Cl.$^5$ ........................ H04N 5/213; H04N 7/00; H04N 5/52
[52] U.S. Cl. .................................... 358/167; 358/166; 358/96; 358/174; 358/177
[58] Field of Search ................. 358/184, 166, 167, 98, 358/909, 174, 181; 382/22, 50

[56] References Cited

U.S. PATENT DOCUMENTS 4,525,738  6/1985  Imazeki et al. ..................... 358/181
4,748,677  5/1988  Yokomizo ............................ 382/50
4,839,725  6/1989  Ueda ..................................... 358/96

FOREIGN PATENT DOCUMENTS 0095484  5/1986  Japan ...................................... 382/50

Primary Examiner—John K. Peng
Attorney, Agent, or Firm—Shapiro and Shapiro

[57] ABSTRACT

A video signal processing circuit comprises an amplifying circuit including selectable amplifying portions with different amplification factors, respectively, and an outline emphasizing circuit including portions with different degrees of outline emphasis, respectively. The relationship of the outline emphasizing circuit and the amplifying circuit is such that the degree of outline emphasis is dependent upon the amplification factor, so that the conspicuousness of noise is reduced. Where three amplification portions are employed, two of them having amplification factors smaller than the third may be connected to an outline emphasizing portion having the larger outline emphasis degree of a pair of outline emphasizing portions and the third may be connected to the outline emphasizing portion of smaller outline emphasis degree, whereby a similar outline emphasis is obtained for two different amplification factors.

4 Claims, 3 Drawing Sheets

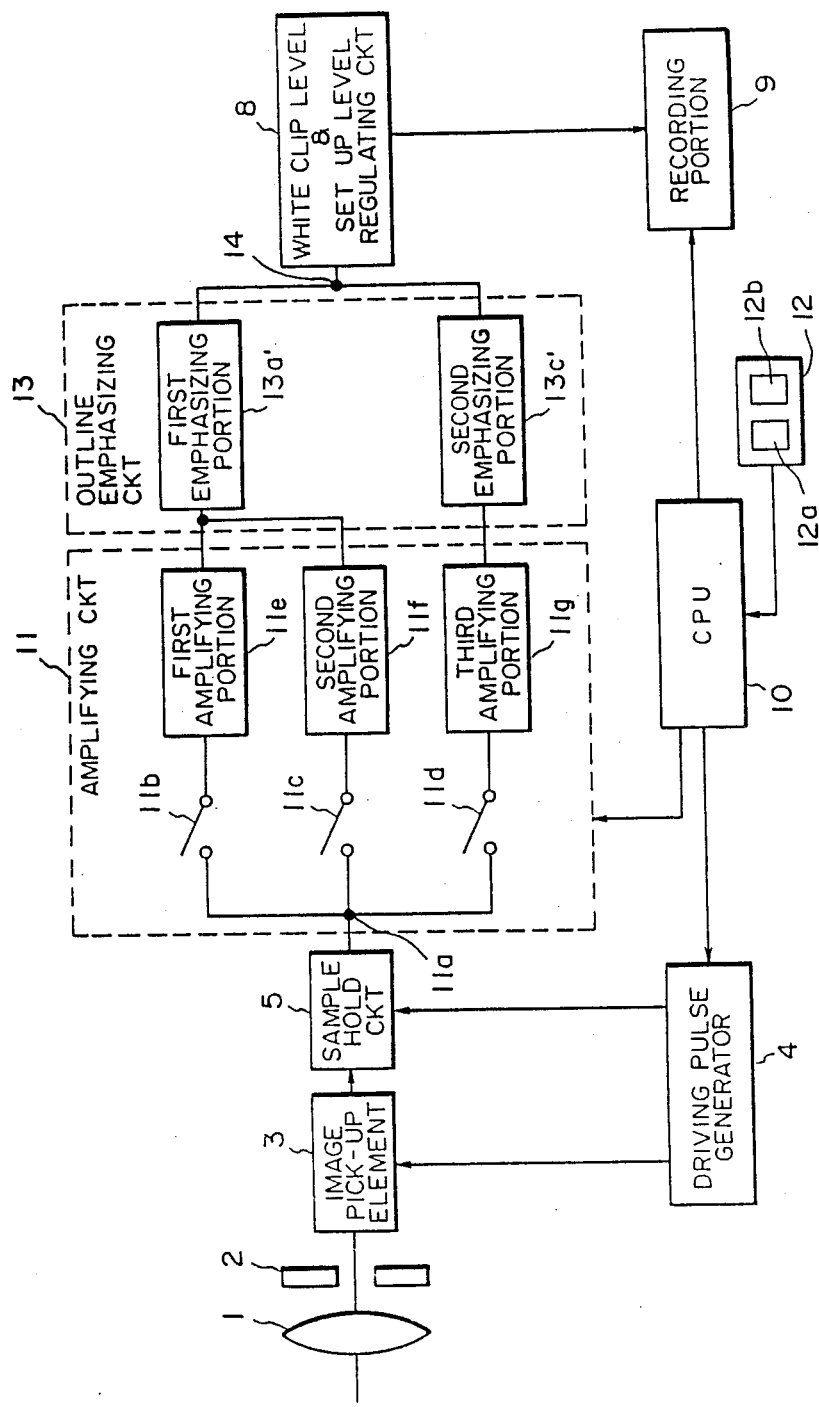
F I G. 3

VIDEO SIGNAL PROCESSING CIRCUIT

BACKGROUND OF THE INVENTION

1. Field of the Invention

The present invention relates to a video signal processing circuit of a television camera, a video camera, an electronic still camera, or the like.

2. Related Background Art

FIG. 2 is a block diagram showing a construction of a conventional video signal processing circuit.

In FIG. 2, an image pick-up element 3 for receiving a light beam from an object (not shown) through an optical lens 1 and a diaphragm member 2 is an element for converting the light into an electric signal and comprises a solid state image pick-up element such as CCD (charge coupled device), MOS device, or the like. The image pick-up element 3 operates by various kinds of charge transfer pulses from a driving pulse generator 4. An output terminal of the image pick-up element 3 is connected to a sample hold circuit 5. The driving pulse generator 4 generates a charge transfer pulse for driving to the image pick-up element 3 and a sampling pulse for sampling and holding to the sample hold circuit 5. The sample hold circuit 5 samples and holds an output signal from the image pick-up element 3 at a predetermined timing and outputs an analog video signal to an amplifying circuit 6. Next, the video signal whose level was amplified by the amplifying circuit 6 is input to an outline emphasizing circuit 7. the outline emphasizing circuit 7 emphasizes an outline of a change point of the video signal. An output terminal of the outline emphasizing circuit 7 is connected to a white clip level and set up level regulating circuit 8. An output terminal of the regulating circuit 8 is connected to a recording portion 9. A central processing unit (CPU) 10 which is connected to the recording portion 9 and driving pulse generator 4 controls the operation of the apparatus. The CPU 10 controls the generation of pulses from the driving pulse generator 4 and allows the recording portion 9 to record an output signal from the regulating circuit 8.

In the above construction, when the light beam from the object (not shown) enters the image pick-up element 3 through the optical lens 1 and diaphragm member 2, as mentioned above, the video signal obtained by the image pick-up element 3 and sample hold circuit 5 is input to the amplifying circuit 6. The amplifying circuit 6 electrically amplifies the level of the video signal in accordance with an arbitrary amplification factor. A predetermined outline emphasis is executed by the outline emphasizing circuit 7. Subsequently, the regulating circuit 8 regulates the white clip level and set up level of the video signal from the outline emphasizing circuit 7. Thereafter, the video signal is recorded by the recording portion 9.

As mentioned above, in the conventional video signal processing apparatus, the noise portion in the output signal from the sample hold circuit 5 is also amplified by the amplifying circuit 6 shown in FIG. 2, so that there is a problem in that if a predetermined outline emphasis is applied to the output signal from the amplifying circuit 6 by the outline emphasizing circuit 7, noise is generated conspicuously.

SUMMARY OF THE INVENTION

The present invention is made in consideration of the above problems and it is an object of the invention to obtain a video signal processing apparatus in which when an outline emphasis is applied to an output signal from an amplifying circuit by an outline emphasizing circuit, a conspicuous degree of noise is suppressed.

To accomplish the above object, an apparatus according to the invention will be described with reference to FIG. 1 corresponding to a first embodiment of the invention. In a video signal processing circuit comprising an amplifying circuit for amplifying a level of a video signal according to an image of an object and an outline emphasizing circuit for applying an outline emphasis to the video signal whose level was amplified by the amplifying circuit, an apparatus of the invention comprises: instructing means for outputting a command signal; and control means for changing the amplification factor of the amplifying circuit in response to the command signal of the instructing means, wherein the magnitude of the outline emphasis by the outline emphasizing circuit is changed in accordance with the change in the amplification factor.

According to the above construction, if the control means decreases the amplification factor of the amplifying circuit in response to the command signal of the instructing means, the amplifying circuit amplifies the level of the output signal from a sample hold circuit in FIG. 1 at a small amplification factor as. Thus, large noise generation is prevented. In accordance with the decrease in the amplification factor of the amplifying circuit, the degree of outline emphasis by the outline emphasizing circuit is increased. Although a large degree of outline emphasis is applied to the video signal which was amplified at a small amplification factor by the amplifying circuit, the noises not is conspicuous. On the other hand, if the control means increases the amplification factor of the amplifying circuit in response to the command signal of the instructing means and the amplifying circuit largely amplifies the level of the output signal from a sample hold circuit in FIG. 1 and noise is generated, by reducing the magnitude of the outline emphasis by the outline emphasizing circuit in accordance with an increase in the amplification factor and by applying such outline emphasis to the video signal amplified at the large amplification factor by the amplifying circuit, large noise generation is prevented. Therefore, a video signal processing circuit which suppresses the conspicuousness of noise can be obtained.

In accordance with a second embodiment of the invention, shown in FIG. 3, an outline emphasizing circuit comprises a pair of outline emphasizing portions having smaller and larger outline emphasis degrees, respectively. Three amplifying portions of an amplifying circuit, having different amplification factors, respectively, are connected to the outline emphasizing circuit such that two of the amplifying portions having amplification factors smaller than the third are connected to the outline emphasizing portion having the large outline emphasis degree and the third amplifying portion is connected to the outline emphasizing portion having the smaller outline emphasis degree. With such a construction, a similar outline emphasis is obtained for two different amplification factors.

BRIEF DESCRIPTION OF THE DRAWINGS

FIG. 3 is a block diagram showing a construction of a video signal processing circuit according to a second embodiment of the present invention.

DESCRIPTION OF THE PREFERRED EMBODIMENT

Figure 1:
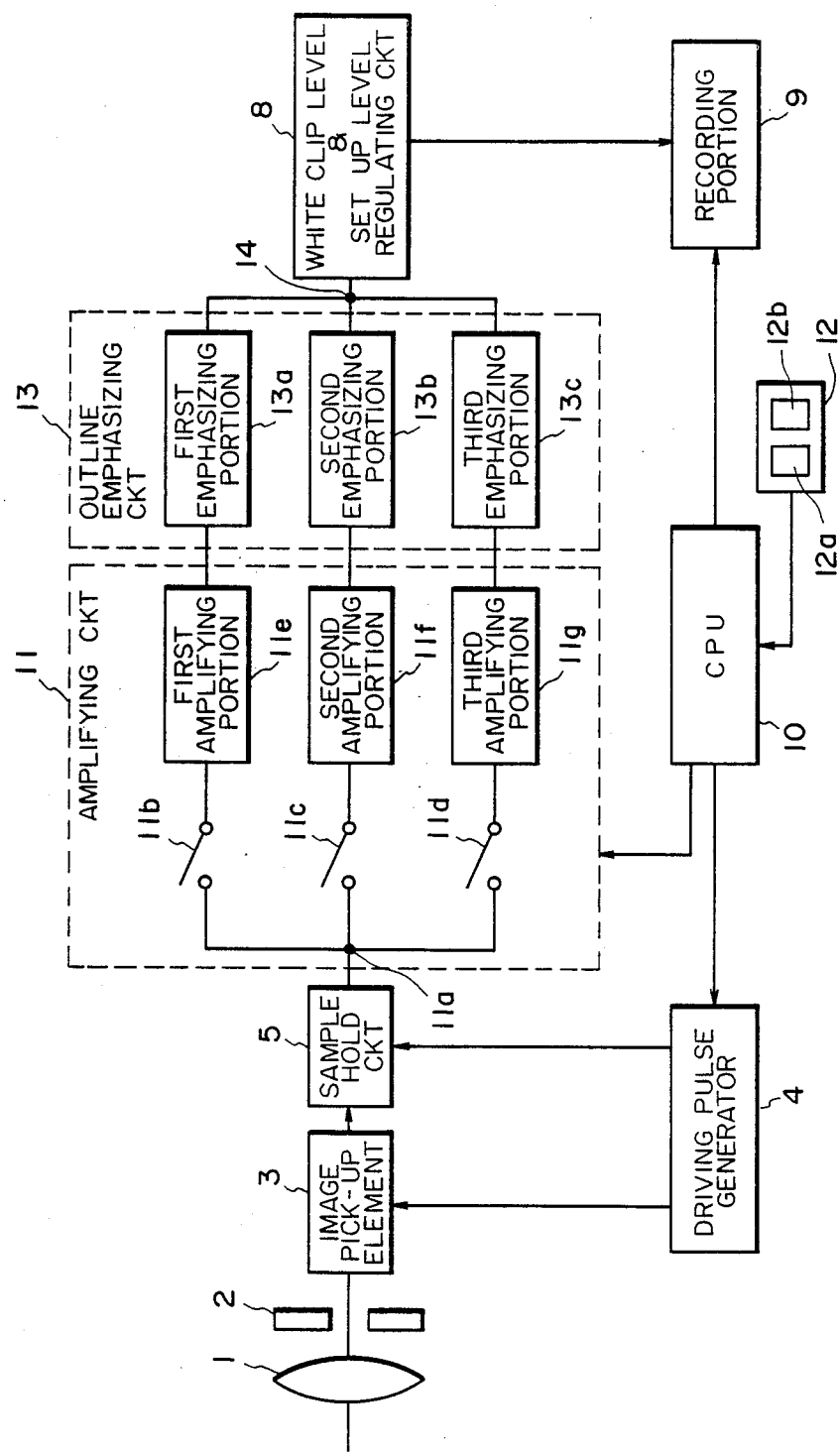
FIG. 1 is a block diagram showing a construction of a video signal processing circuit according to a first embodiment of the present invention.
Figure 2:
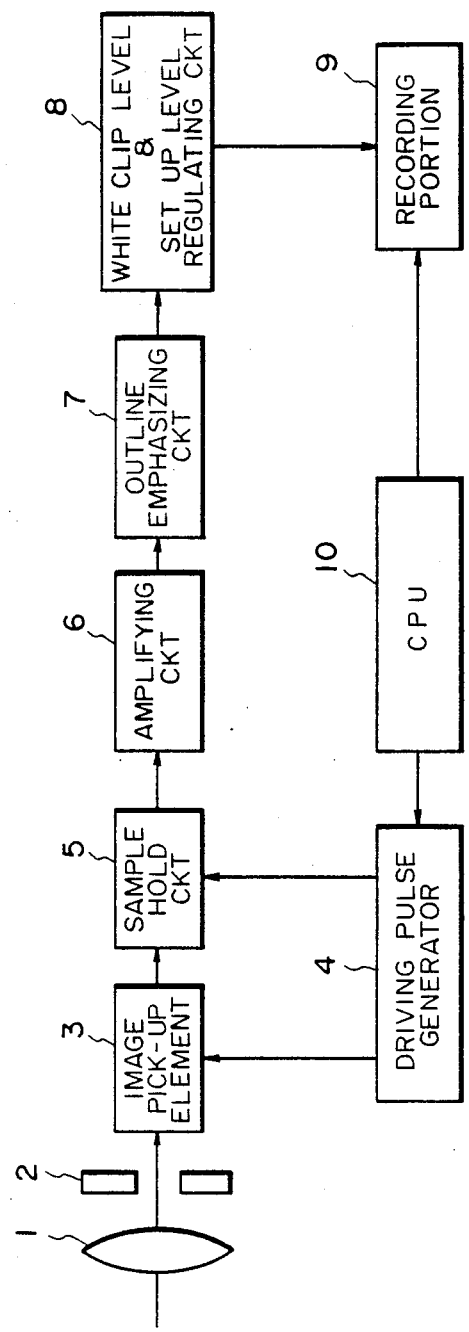
FIG. 2 is a block diagram showing a construction of a conventional video signal processing circuit.

FIG. 1 is a block diagram showing a construction of a video signal processing circuit according to a first embodiment of the invention. In FIG. 1, since the same optical parts and circuits as those shown in FIG. 2 are designated by the same reference numerals, their descriptions are omitted.

In FIG. 1, the output terminal of the sample hold circuit 5 is connected in parallel with three on/off switches 11b to 11d through a contact 11a as shown in the diagram. Output terminals of the switches 11b to 11d are connected to amplifying portions 11e to 11g, respectively. Amplification factors of the amplifying portions 11e to 11g are set to 2, 4, and 8, respectively. The contact 11a, the first to third switches 11b to 11d, and the first to third amplifying portions 11e to 11g constitute an amplifying circuit 11. The amplifying circuit 11 is connected to a keyboard 12 having two keys 12a and 12b through the CPU 10. The keyboard 12 together with the two keys 12a and 12b constitutes instructing means for outputting a command signal to the CPU 10 to change an amplification factor of the amplifying circuit 11. The first to third switches 11b to 11d of the amplifying circuit 11 are normally open. By operating the keys 12a and 12b of the keyboard 12, the keyboard 12 outputs a command signal to the CPU 10. The CPU 10 closes any one of the switches 11b to 11d in response to the command signal. Thus, the video signal from the sample hold circuit 5 is input through the closed switch to the amplifying portion connected thereto. Since the amplification factors of the first to third amplifying portions 11e to 11g are set to 2, 4, and 8, as mentioned above, the CPU 10 is used as control means for changing the magnitude of the amplification factor of the amplifying circuit 11 in response to the command signal of the keyboard 12.

The output terminals of the amplifying portions 11e to 11g are connected to outline emphasizing portions 13a to 13c. In the outline emphasizing portions 13a to 13c, assuming that the magnitude of the outline emphasis is shown by eight stages, the first outline emphasizing portion 13a sets the emphasis degree to 8, the second outline emphasizing portion 13b sets the emphasis degree to 4, and the third outline emphasizing portion 13c sets the emphasis degree to 2, respectively. The first to third outline emphasizing portions 13a to 13c constitute an outline emphasizing circuit 13.

The relationship between the amplifying circuit 11 and the outline emphasizing circuit 13 is constructed in a manner such that the magnitude of the outline emphasis by the outline emphasizing circuit 13 is changed in inverse proportion to the change in magnitude of the amplification factor of the amplifying circuit 11 by the CPU 10. The first to third outline emphasizing portions 13a to 13c are connected to the regulating circuit 8 through a contact 14.

In the video signal processing circuit of the invention, the operations leading to the amplifying circuit 11 are similar to those in the conventional circuit as mentioned above. In conjunction with the above operations, one key e.g., 12a, of the keyboard 12 is depressed and a command signal to increase the amplification factor of the amplifying circuit 11 is output to the CPU 10 by the keyboard 12. In response to the command signal, the CPU 10 closes the third switch 11d in the amplifying circuit 11. Due to this, the video signal from the sample hold circuit 5 is input to the third amplifying portion 11g through the contact 11a and third switch 11d. Since the amplification factor of the third amplifying portion 11g is set to 8 as mentioned above, the level of the video signal from the sample hold circuit 5 is amplified by the amplification factor of 8. Due to this, even if noise is generated, since the emphasis degree of the third outline emphasizing portion 13c is merely set to 2 as mentioned above, a small outline emphasis is applied. Thus, a situation in which a large degree of outline emphasis is applied in proportion to the magnitude of the amplification factor, as in the conventional circuit, is eliminated and the conspicuousness of noise can be suppressed. On the other hand, by depressing the key 12b of the keyboard 12, the keyboard 12 outputs a command signal to the CPU 10 to reduce the amplification factor of the amplifying circuit 11 and the CPU 10 closes the first switch 11e in response to the command signal. Due to this, the video signal from the sample hold circuit 5 passes through the contact 11a and first switch 11b and is input to the first amplifying portion 11e. The level of the video signal is amplified at the amplification factor of merely 2 by the first amplifying portion 11e. Although the first outline emphasizing portion 13a applies the outline emphasis at an emphasis degree of 8, noise is not largely generated in the video signal and the conspicuousness of the noise can be suppressed. Further, by sequentially pressing the keys 12a and 12b of the keyboard 12, the CPU 10 closes the second switch 11c in response to the command signal which is output from the keyboard 12. Due to this, the video signal from the sample hold circuit 5 passes through the contact 11a and second switch 11c and is input to the second amplifying portion 11f. The level of the video signal is amplified at an amplification factor of 4 by the second amplifying portion 11f. Next, the second outline emphasizing portion 13b applies outline emphasis at an emphasis degree of 4. The second amplifying portion 11f and outline emphasizing portion 13b amplify the level of the video signal and apply outline emphasis in accordance with values between those of the first amplifying portion 11b and outline emphasizing portion 13a and the third amplifying portion 11g and outline emphasizing portion 13c. Therefore, noises is not largely generated in the video signal and the conspicuousness of noise can be suppressed.

The video signal output from either one of the first to third outline emphasizing portions 13a to 13c is input to the regulating circuit 8 through the contact 14 and is recorded by the recording portion 9. These operations are similar to those in the conventional circuit.

According to the above embodiment, the CPU 10 changes the magnitude of the amplification factor of the amplifying circuit 11 in response to the command signal of the keyboard 12 by the two keys 12a and 12b. However, in place of using the keyboard 12, the video signal of the image pick-up element 3 in FIG. 1 may be output to the CPU 10 and the magnitude of the amplification factor of the amplifying circuit 11 may be automatically changed in accordance with the video signal level by the CPU 10. In such a case, the video signal of the image pick-up element 3 is also used as a command signal to change the magnitude of the amplification factor of the amplifying circuit 11.

The magnitudes of the outline emphasis of the first and second outline emphasizing portions 13a and 13b may be set to the same value. In a second embodiment, the outline emphasizing circuit 13 is constituted by only two outline emphasizing portions, by omitting one of the three outline emphasizing portions in the outline emphasizing circuit 13. As shown in FIG. 3 the amplifying portions 11e and 11f are connected to an outline emphasizing portion 13a' having the large outline emphasis degree of two outline emphasizing portions and the amplifying portion 11g is connected to an outline emphasizing portion 13c' of the smaller outline emphasis degree. With such a construction, a similar outline emphasis is obtained for two different amplification factors.

In a modification of the first embodiment, a variable amplifying circuit may be used in place of the amplifying circuit 11 having three amplifying portions 11e to 11g and a variable outline emphasizing circuit may be used in place of the outline emphasizing circuit 13 having three outline emphasizing portions 13a to 13c. In response to the command signal from the keyboard 12 in FIG. 1 or the image pick-up element 3, the CPU 10 may change the magnitude of an amplification factor of the variable amplifying circuit, while the emphasis degree of the variable outline emphasizing circuit is changed in inverse proportion to the change in the magnitude of the amplification factor. Due to this, the conspicuousness of the noise can be suppressed in a manner similar to the above.

We claim:
1. A video signal processing circuit comprising:
   amplifying means including first, second, and third amplifying portions having different amplification factors, respectively;
   selecting means for selecting any one of said amplifying portions to amplify a video signal;
   outline emphasizing means for processing a video signal from the selected amplifying portion, including a pair of outline emphasizing portions having different degrees of outline emphasis, respectively; and
   means for connecting an output of each of said first and second amplifying portions to an input of one of said pair of outline emphasizing portions and for connecting an output of the third amplifying portion to an input of the other of said pair of outline emphasizing portions.

2. A video signal processing circuit according to claim 1, wherein the amplification factor of said first and second amplifying portions is smaller than the amplification factor of said third amplifying portion, and wherein the degree of outline emphasis of said one of said pair of outline emphasizing portions is greater than that of said other of said pair of outline emphasizing portions.

3. A video signal processing circuit according to claim 1, wherein said selecting means includes switch means for allowing said selecting means to select one of said amplifying portions in accordance with an input signal.

4. A video signal processing circuit according to claim 3, wherein said switch means is a keyboard having an up key and a down key, said keyboard allowing said selecting means to select one of said amplifying portions having the next larger amplification factor with respect to the amplification factor of a presently selected amplifying portion in response to a depression of said up key, said keyboard allowing the selecting means to select one of said amplifying portions having the next smaller amplification factor with respect to the amplification factor of the presently selected amplifying portion in response to a depression of said down key.

* * * * *